United States Patent [19]

Caron et al.

[11] Patent Number: 4,614,402

[45] Date of Patent: Sep. 30, 1986

[54] FIBER OPTIC CONNECTOR AND METHOD OF TERMINATING FIBER OPTIC TRANSMISSION MEMBERS

[75] Inventors: Bernard G. Caron, Harrisburg; Ronald F. Cooper, Orrtanna, both of Pa.

[73] Assignee: AMP Incorporated, Harrisburg, Pa.

[21] Appl. No.: 821,869

[22] Filed: Jan. 23, 1986

Related U.S. Application Data

[63] Continuation of Ser. No. 501,599, Jun. 6, 1983.

[51] Int. Cl.[4] .............................................. G02B 6/38
[52] U.S. Cl. ................................................. 350/96.21
[58] Field of Search ............... 350/96.20, 96.21, 96.22

[56] References Cited

U.S. PATENT DOCUMENTS

| | | | |
|---|---|---|---|
| 3,999,837 | 12/1976 | Bowen et al. | 350/96.22 |
| 4,233,724 | 11/1980 | Bowen et al. | 29/428 |
| 4,362,356 | 12/1982 | Williams et al. | 350/96.20 |
| 4,448,483 | 5/1984 | Ryley, Jr. | 350/96.20 |
| 4,534,616 | 8/1985 | Bowen et al. | 350/96.20 |

*Primary Examiner*—William L. Sikes
*Assistant Examiner*—Akm E. Ullah
*Attorney, Agent, or Firm*—Adrian J. LaRue; Anton P. Ness

[57] ABSTRACT

A fiber optic connector comprises a housing member and ferrule members. The housing member is rigid and has a profiled bore extending therethrough. The bore has a central cylindrical surface, tapered surfaces on each side of the cylindrical surface, and a support surface at the outer ends of the tapered surfaces. The ferrule members are of resilient deformable material and are terminated onto fiber optic transmission members. The ferrule members have profiled front ends comprising front cylindrical sections of slightly larger diameter than the central cylindrical surface, tapered sections slightly smaller than the bore tapered surfaces and rear sections for engagement with the support surfaces. Radiussed surfaces are located at the forward ends of the front cylindrical sections. Coupling members engage shoulder members of the ferrule members urging the profiled front ends into the profiled bore with the front cylindrical sections tightly engaging the central cylindrical surface thereby applying a radial compressive force to the front cylindrical sections and axially aligning the fiber optic transmission members, the front surfaces of the ferrule members engaging each other and the radiussed surfaces forming an annular reservoir surrounding the front ends of the ferrule members within the central cylindrical surface.

6 Claims, 9 Drawing Figures

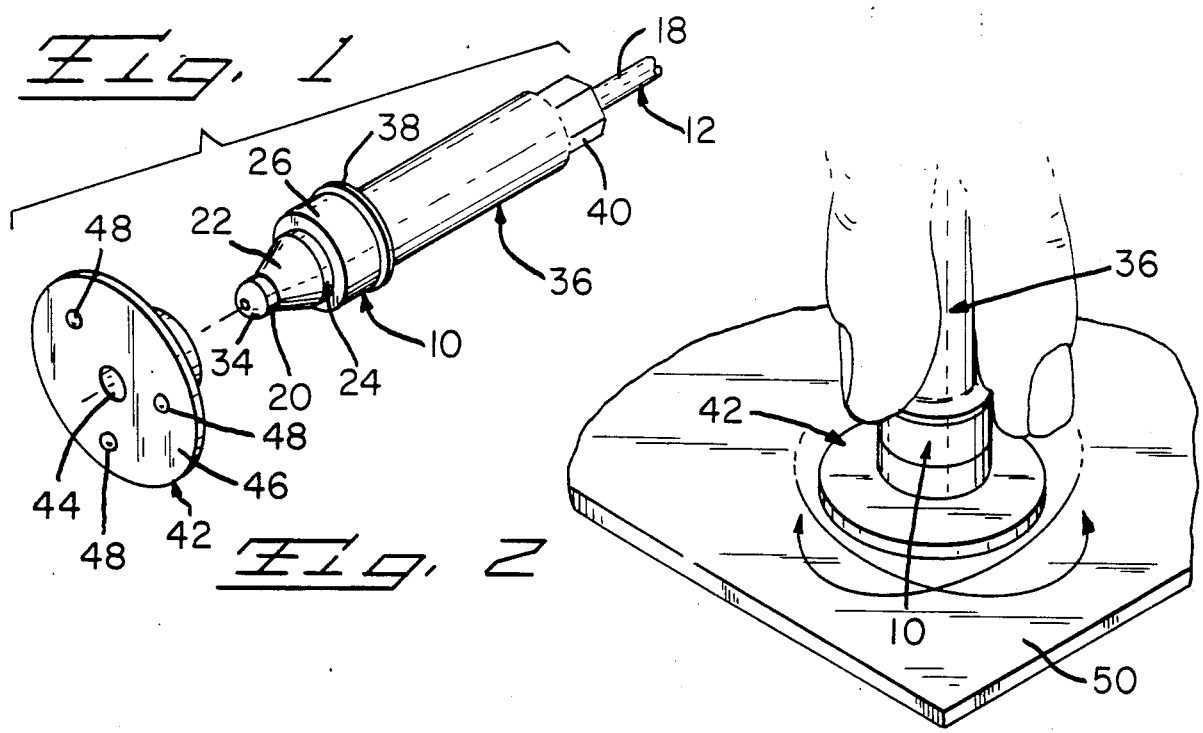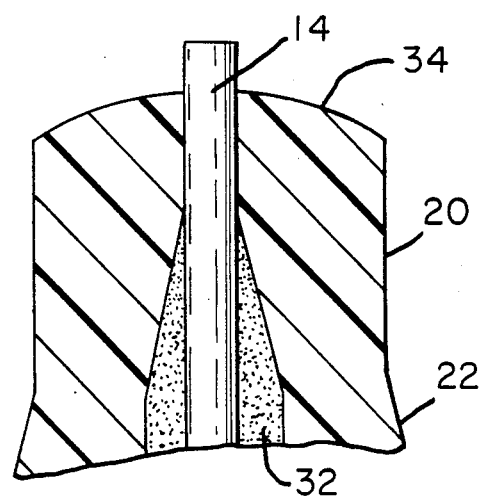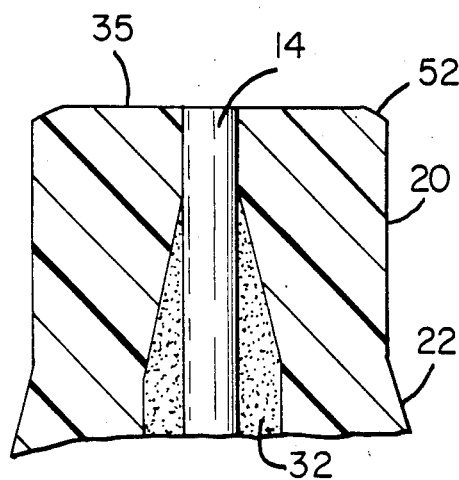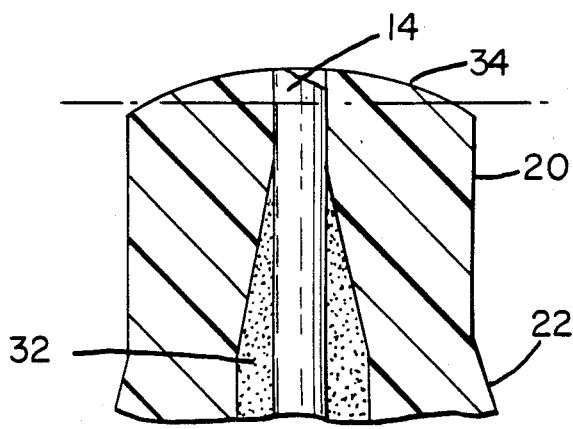

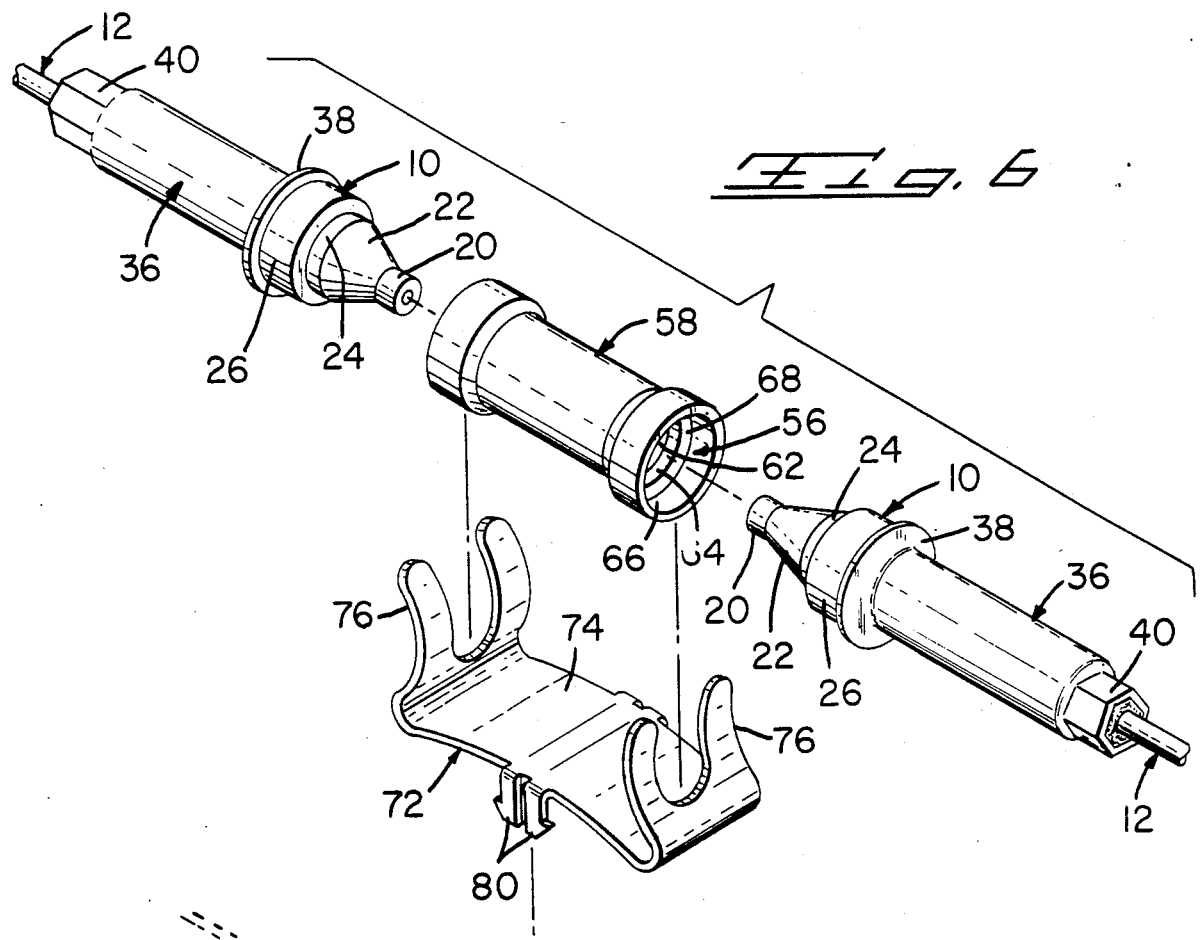
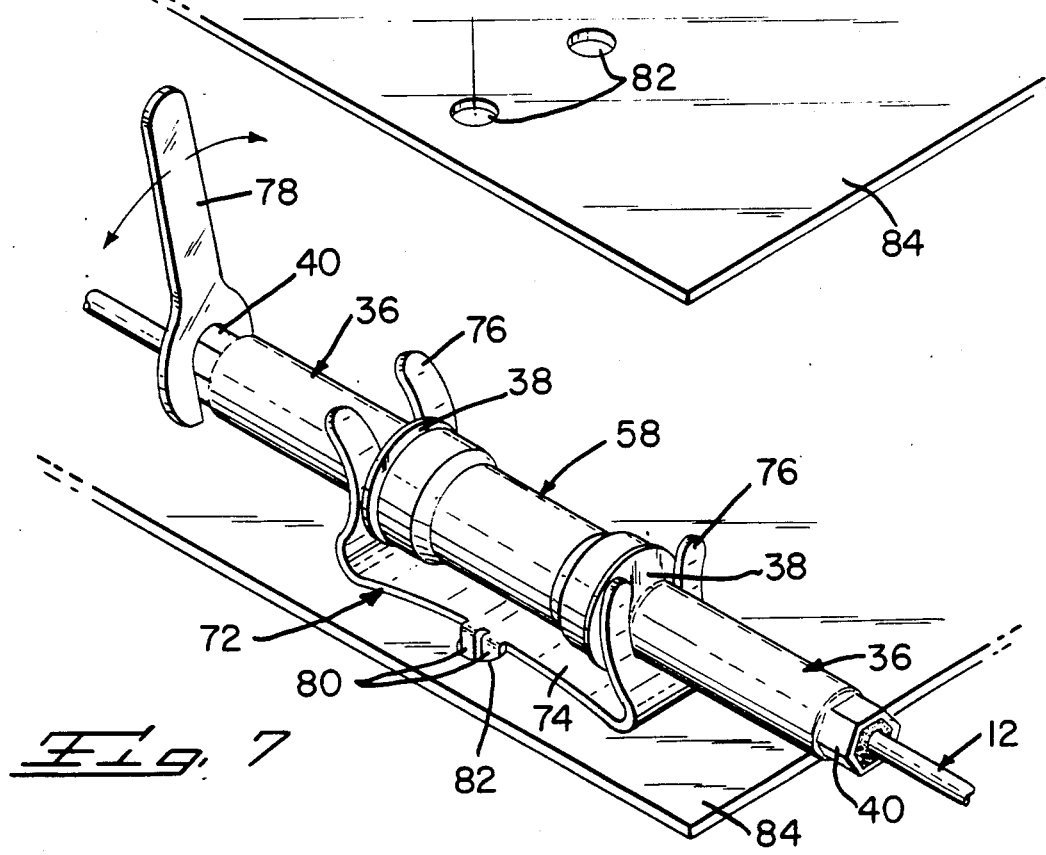

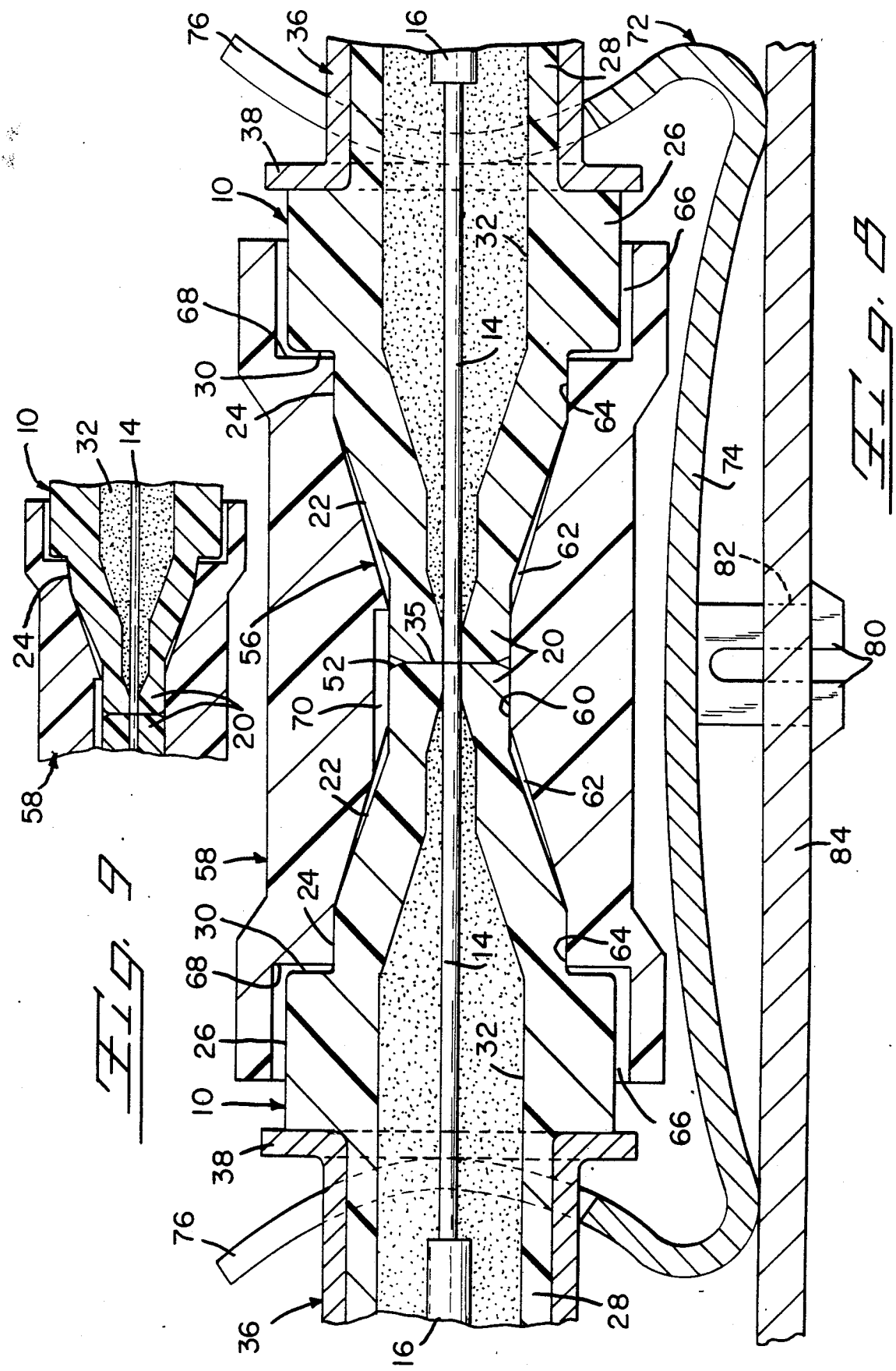

FIBER OPTIC CONNECTOR AND METHOD OF TERMINATING FIBER OPTIC TRANSMISSION MEMBERS

This application is a continuation of application Ser. No. 501,599 filed June 6, 1983.

FIELD OF THE INVENTION

This invention relates to fiber optic connectors and a method of terminating fiber optic transmission members.

BACKGROUND OF THE INVENTION

Fiber optic connectors are used in equipment that is subject to wide temperature variations which can be from −40° C. to 85° C., especially in telecommunication and data transmission equipment. The fiber optic connectors will expand and contract under these temperatures. If a fluid is used in the connectors, the fluid under elevated temperatures will be forced away from the interface between ferrule members of the connector and will not return under lower temperatures because of the connector structure. The front ends of the connectors also need room to expand under elevated temperatures to prevent damage from occurring to the ends of the fiber optic transmission members. This is necessary even if no fluid is used.

SUMMARY OF THE INVENTION

According to the present invention, a fiber optic connector comprises a housing member and ferrule members. The housing member is rigid and has a profiled bore extending therethrough. The bore has a central cylindrical surface, tapered surfaces on each side of the cylindrical surface, and a support surface at the outer ends of the tapered surfaces. The ferrule members are of resilient deformable material and are terminated onto fiber optic transmission members. The ferrule members have profiled front ends comprising front cylindrical sections of slightly larger diameter than the central cylindrical surface, tapered sections slightly smaller than the bore tapered surfaces and rear sections for engagement with the support surfaces. Radiussed surfaces are located at the forward ends of the front cylindrical sections. Coupling members engage shoulder members of the ferrule members urging the profiled front ends into the profiled bore with the front cylindrical sections tightly engaging the central cylindrical surface thereby applying a radial compressive force to the front cylindrical sections and axially aligning the fiber optic transmission members, the front surfaces of the ferrule members engaging each other and the radiussed surfaces forming an annular reservoir surrounding the front ends of the ferrule members within the central cylindrical surface.

According to a method of terminating a fiber optic transmission member in a ferrule member, the ferrule member is molded with a domed surface at its front end and a hole extending therethrough which communicates with a bore in the ferrule member, the fiber optic transmission member is secured in the bore with a part extending outwardly beyond the domed end, the part is cut or cleaved coincident with the domed end, and the domed end and end of the fiber optic transmission member is polished forming a flat polished end surface of the domed end and the end of the fiber optic transmission member and leaving a radiussed surface extending between the flat surface and the cylindrical surface of the front end of the ferrule member.

BRIEF DESCRIPTION OF THE DRAWINGS

FIG. 1 is a perspective view of a ferrule member terminated to a fiber optic transmission member and a polishing fixture exploded therefrom.

FIG. 2 is a perspective view showing the polishing of the front end of the ferrule member and fiber optic transmission member.

FIG. 3 is a cross-sectional view of the front end of the ferrule member terminated onto a fiber optic transmission member prior to polishing.

FIG. 4 is a view similar to FIG. 3 after the front end of the ferrule member and fiber optic transmission member have been polished.

FIG. 5 is a view similar to FIG. 3 showing a cleaved end of a fiber optic transmission member prior to polishing the front end of the terminated ferrule member.

FIG. 6 is a perspective and exploded view of a fiber optic connector utilizing ferrule members of FIG. 4.

FIG. 7 is a view similar to FIG. 6 showing the connector in an assembled condition and being fine tuned to accurately align the axes of the fiber optic transmission members.

FIG. 8 is a cross-sectional view of FIG. 7.

FIG. 9 is a part cross-sectional view of an alternative embodiment.

DETAILED DESCRIPTION OF THE INVENTION

A ferrule member 10 is terminated onto an end of a fiber optic cable 12. The fiber optic cable 12 includes a fiber optic transmission member 14 surrounded by cladding material to enable light to be transmitted therealong. Buffer material 16 as shown in FIG. 8 protects the cladded fiber optic transmission member 14 and an outer jacket 18 protects the entire cable assembly. The cable typically includes strength members (not shown) to provide tensile strength thereto. Fiber optic cable 12 is stripped to expose a length of fiber optic transmission member 14 to enable it to be terminated in ferrule member 10. Fiber optic transmission member 14 can be either plastic or glass.

Ferrule member 10 is preferably molded from a suitable plastic material having resilient characteristics. Ferrule member 10 is of the type disclosed in U.S. Pat. No. 3,999,837, the disclosure of which is completely incorporated herein by reference. Ferrule member 10 has a profiled front end which comprises a front cylindrical section 20, a tapered section 22, an intermediate cylindrical section 24, a rear cylindrical section 26, and a tubular section 28. A shoulder 30 is located at the junction of sections 24 and 26. A profiled bore 32 extends through ferrule member 10 and necks down in front cylindrical section 20 to a diameter to accommodate fiber optic transmission member 14. Front surface 34 of ferrule member 10 has a domed configuration when formed as best illustrated in FIG. 3. A metal ferrule 36 is disposed on tubular section 28 and has a flange 38 in engagement with section 26. Outer end 40 of metal ferrule 36 has a hexagonal or other suitable configuration.

Fiber optic cable 12 is terminated in ferrule member 10 by inserting a stripped end of fiber optic cable 12 within bore 32 until a short section of fiber optic transmission member 14 extends outwardly beyond domed front end 34. An epoxy resin can be located in bore 32 to secure fiber optic transmission member 14 in position in ferrule member 10, whereafter metal ferrule 36 is crimped onto outer jacket 18 of fiber optic cable 12 thereby terminating fiber optic cable 12 in ferrule member 10. The section of fiber optic transmission member 14 that extends beyond domed front end 34 is removed by cutting, if transmission member 14 is plastic, or is cleaved, if transmission member 14 is glass. Fiber optic cable 12 can be secured in ferrule member 10 in accordance with the teachings of U.S. patent application Ser. No. 381,495 filed May 24, 1982 or in any other suitable manner.

After fiber optic cable 12 has been terminated in ferrule member 10, the profiled front end of ferrule member 10 is frictionally positioned in a profiled bore 44 of polishing fixture 42; bore 44 has the same configuration as that of sections 20, 22, and 24 of ferrule member 10 except that they are dimensioned to compress section 20 in tight engagement with the fiber optic transmission member 14 in bore 32 and the domed front end 34 extends beyond the outer flat surface 46 of fixture 42. Radiussed projections 48 extend outwardly from surface 46.

Terminated ferrule member 10 with fixture 42 thereon is now subjected to a polishing action by fixture 42 moving relative to a polishing medium 50 such as, for example, very fine silicon carbide or aluminum oxide grit as shown in FIG. 2 for a period of time. Radiussed projections 48 stabilize the polishing and, when they are worn away, the domed front surface 34 along with the end of fiber optic transmission member 14 are polished as a flat surface 35 and are in the same plane as illustrated in FIG. 4 leaving a radiussed peripheral surface 52 at an angle from front surface 35 and extending between the front polished surface 35 and the external surface of cylindrical section 20.

As shown in FIG. 5, when fiber optic transmission member 14 is glass and is cleaved, the cleaved end can be uneven. Thus, when the domed front end 34 is polished as hereinabove described, the uneven end of fiber optic transmission member 14 is polished to a flat planar configuration as shown in FIG. 4 thereby eliminating the fragmented end.

Advantages of having a domed front surface 34 are less material to polish and this reduces the amount of time to polish the front end of ferrule member 10.

Terminated ferrule members 10 can now be connected together in a profiled bore 56 of a rigid connector housing member 58 which is of the type disclosed in U.S. patent application Ser. No. 415,123 filed Sept. 7, 1982, the disclosure of which is incorporated herein by reference. Profiled bore 56 has a central cylindrical surface 60, tapered surfaces 62 on each side of surface 60, cylindrical support surfaces 64, and outer cylindrical surfaces 66. Shoulders 68 are located at the junctions between surfaces 64 and 66. A slot 70 is located in communication with central cylindrical surface 60 as shown in FIG. 8.

The diameters of front cylindrical sections 20 of ferrule members 10 are slightly greater than the diameter of central cylindrical surface 60 of bore 56 and this is also true with respect to intermediate cylindrical sections 24 of ferrule members 10 being slightly greater than cylindrical support surfaces 64 of profiled bore 56. The dimensions of tapered sections 22 of ferrule members 10 are slightly less than that of tapered surfaces 62 of profiled bore 56. Thus, when the profiled front ends of ferrule members 10 are inserted into profiled bore 56, the resilient nature of the material of ferrule member 10 will cause the front sections 20 to be compressibly reduced in diameter as a result of a radial compressive force being applied by housing member 58 thereby concentrically aligning fiber optic transmission members 14 so that they are axially aligned within central cylindrical section 20 of profiled bore 56 as shown in FIG. 8. The tight engagement of intermediate cylindrical sections 24 with corresponding cylindrical support surfaces 64 will support the ferrule members 10 within bore 56 to resist lateral forces being applied to the outer ends of ferrule members 10 and to form a seal thereat as disclosed in U.S. patent application Ser. No. 501,597 filed June 6, 1983. Depending on the tolerances involved, shoulders 30 of ferrule members 10 can abut against shoulders 68 of housing members 58 limiting the movement of ferrule members 10 within bore 56. Sections 24 can be slightly tapered along with support surfaces 64, if desired, as shown in FIG. 9.

In many cases, a fluid that has an index of refraction substantially equal to that of fiber optic transmission members 14 is located at the interface between the flat front surfaces 35 of ferrule member 10 which enhances the transmission of light between the fiber optic transmission members 14 and protects the front ends of the fiber optic transmission members 14 when engagement therebetween takes place. The reservoir formed by radiussed surfaces 52 at the peripheries of the front ends of sections 20 of ferrule members 10 as shown in FIG. 8 will enable the fluid to be collected therein upon expansion of the fluid as a result of higher temperatures and the fluid can also move into slot 70 if the temperatures are quite high. The fluid will be retained within the fiber optic connector by virtue of the seal formed between sections 24 and 64. Slot 70 also acts as a vent to prevent hydraulic action from taking place when index-matching fluid is used; slot 70 also can prevent entrapped air from forcing the ferrule members apart under high temperature if no index-matching liquid is used.

Spring clip member 72 forms a coupling member which engages ferrule members 10 urging them into bore 56 and maintaining them therein. Spring clip member 72 is stamped and formed from a metal having suitable spring characteristics such as, for example, spring steel, and it includes an arcuate-shaped base member 74 from the ends of which extend curved forks 76. A fiber optic connector which comprises the profiled front ends of ferrule members 10 disposed in profiled bore 56 of rigid housing 58 is positioned in spring clip member 72 with metal ferrules 36 being disposed in curved forked ends 76 as shown in FIGS. 7 and 8, with the curved forked ends 76 engaging against flanges 38 of metal ferrules 36 thereby applying axial forces onto ferrule members 10 to maintain cylindrical sections 20 in concentric alignment within central cylindrical sections 60 of profiled bore 56 of housing member 58 thereby maintaining fiber optic transmission members 14 in axial alignment due to the resilient characteristics of ferrule members 10. The arcuate configuration of base member 74 contributes to the spring characteristics of forked ends 76. Other types of coupling members can, of course, be used such as, for example, threaded members, bayonet members or the like, and coil springs would then be used on metal ferrules 36.

After the fiber optic connector has been positioned in spring clip member 72, light can be transmitted along fiber optic transmission members 14 to determine if further alignment is necessary. If further alignment is necessary, a wrench 78 is used on outer end 40 of one of metal ferrules 36 and the corresponding ferrule member 10 can be rotated to accurately align the axes of fiber optic transmission members 14.

A pair of barbed legs 80 extend outwardly from base member 74 on each side at a central location thereof for engagement with holes 82 in a mounting plate 84. Legs 80 need not be present so that spring clip member 72 can maintain the fiber optic connector in a connected condition in a free-hanging manner if desired.

From the foregoing, a fiber optic connector has been described that is sealed from the environment, can withstand wide temperature variations, can be used in many types of installations, enables the fiber optic connectors to be readily disconnected, enables the fiber optic connectors to be adjusted to provide low loss connection, enables the terminations to be tested, and provides a reservoir to accommodate expansion and contraction variations of a fluid disposed between the front ends of mated ferrule members.

We claim:

1. A fiber optic connector for connecting two fiber optic transmission members together, comprising:
    a rigid housing having a profiled bore extending therethrough, said bore having an inner cylindrical surface, a tapered surface extending outwardly from said inner cylindrical surface and a support surface at an outer end of said tapered surface;
    a separate ferrule of resiliently rigid but deformable material terminated onto an end of each fiber optic transmission member each having a profiled front end including a front surface, a front cylindrical section, a tapered section, and a support section, said front surfaces being substantially flat with a front end of each fiber optic transmission member being coincident with a corresponding flat front surface, each said front surface having a peripheral surface at an angle therefrom extending to an external surface of said front cylindrical section, said front cylindrical section being slightly greater in diameter than the diameter of said inner cylindrical surface, said tapered section being slightly smaller in dimension than said tapered surface and said support section being slightly larger in dimension than said support surface, said profiled front ends of said ferrules being disposed in said profiled bore with said front cylindrical sections tightly engaging said inner cylindrical surface causing a reduction in diameter of said front cylindrical sections and centering and axially aligning the fiber optic transmission members, said tapered sections disposed along said tapered surfaces and said support sections tightly and sealingly engaging said support surfaces thereby supporting said ferrules against lateral forces thereon;
    index-matching fluid disposed between both said front surfaces and said housing; and
    coupling means for engaging both said ferrules and urging said profiled front ends thereof both into said profiled bore causing both said front surfaces to at least nearly engage each other with the peripheral surfaces thereof forming a reservoir surrounding the front ends of both said ferrules within said inner cylindrical surface, whereby said index-matching fluid disposed between both said front surfaces is expandable into said reservoir at high temperatures.

2. A fiber optic connector as set forth in claim 1, wherein said housing has a slot in communication with said inner cylindrical surface.

3. A fiber optic connector as set forth in claim 1, wherein said ferrules include a rear cylindrical surface against which said coupling means engage.

4. A fiber optic connector as set forth in claim 1, wherein said peripheral surface is radiussed.

5. A fiber optic connector for connecting two fiber optic transmission members together, comprising:
    a rigid housing having a profiled bore extending therethrough, said bore having an inner cylindrical surface, a tapered surface extending outwardly from said inner cylindrical surface and a support surface at an outer end of said tapered surface;
    a separate ferrule of resiliently rigid but deformable material terminated onto an end of each fiber optic transmission member each having a profiled front end including a front surface, a front cylindrical section, a tapered section, and a support section, said front surfaces being substantially flat with a front end of each fiber optic transmission member being coincident with a corresponding flat front surface, said front cylindrical section being slightly greater in diameter than the diameter of said inner cylindrical surface, said tapered section being slightly smaller in dimension than said tapered surface and said support section being slightly larger in dimension than said support surface, said profiled front ends of said ferrules being disposed in said profiled bore with said front cylindrical sections tightly engaging said inner cylindrical surface causing a reduction in diameter of said front cylindrical sections and centering and axially aligning the fiber optic transmission members, said tapered sections disposed along said tapered surfaces and said support sections tightly and sealingly engaging said support surfaces thereby supporting said ferrules against lateral forces thereon;
    coupling means for engaging both said ferrules and urging said profiled front ends thereof both into said profiled bore causing both said front surfaces to at least nearly engage each other; and
    vent means provided by said inner cylindrical surface of said housing extending from adjacent said profiled front ends of said ferrules, wherealong fluid proximate said profiled front ends is expandable.

6. A fiber optic connector as set forth in claim 5 wherein said vent means is a slot extending axially to said tapered surface of said housing.

* * * * *